US011914628B1

(12) United States Patent
Hearst et al.

(10) Patent No.: US 11,914,628 B1
(45) Date of Patent: Feb. 27, 2024

(54) INCORPORATING DATA VISUALIZATIONS INTO DATABASE CONVERSATIONAL INTERFACES

(71) Applicant: Tableau Software, LLC, Seattle, WA (US)

(72) Inventors: Marti Hearst, Berkeley, CA (US); Melanie K. Tory, Palo Alto, CA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

(21) Appl. No.: 17/206,046

(22) Filed: Mar. 18, 2021

Related U.S. Application Data

(60) Provisional application No. 62/991,342, filed on Mar. 18, 2020.

(51) Int. Cl.
G06F 16/338 (2019.01)
G06F 16/33 (2019.01)
G06F 16/332 (2019.01)

(52) U.S. Cl.
CPC ........ *G06F 16/338* (2019.01); *G06F 16/3329* (2019.01); *G06F 16/3344* (2019.01)

(58) Field of Classification Search
CPC .................................................... G06F 16/338
See application file for complete search history.

(56) References Cited

U.S. PATENT DOCUMENTS 10,474,352 B1* 11/2019 Winters .............. G06F 3/04845
10,515,121 B1 12/2019 Setlur et al.
10,546,001 B1 1/2020 Nguyen et al.
2015/0046429 A1* 2/2015 Eblighatian ....... G06F 16/24542 707/718
2017/0011023 A1 1/2017 Ghannam et al.
2017/0076507 A1 3/2017 Bivins
2017/0154089 A1 6/2017 Sherman
(Continued)

FOREIGN PATENT DOCUMENTS

EP 3535676 A1 9/2019
WO WO2020/076811 A1 4/2020

OTHER PUBLICATIONS

Tableau Software, LLC, International Search Report and Written Opinion, PCT/US2021/040919, dated Oct. 18, 2021, 11 pgs.

(Continued)

*Primary Examiner* — Van H Oberly
(74) *Attorney, Agent, or Firm* — Morgan, Lewis & Bockius LLP

(57) ABSTRACT

A method incorporates data visualization into conversational interfaces. The method receives a user input specifying a natural language command via a conversational interface. The method analyzes the natural language command to determine the type of question. The method also obtains a user preference for viewing responses based on text and/or visualizations. When the user preference includes visualizations and the type of question is answerable using data visualizations, the method: (i) extracts one or more independent analytic phrases from the natural language command; (ii) queries a database using a set of queries based on the extracted analytic phrases, thereby retrieving a data set; and (iii) generates and displays, in the conversational interface, a response incorporating one or more data visualizations, based on the type of question, using the data set.

16 Claims, 21 Drawing Sheets

(56) References Cited

U.S. PATENT DOCUMENTS

| | | |
|---|---|---|
| 2017/0249711 A1 | 8/2017 | Odegard |
| 2017/0277669 A1 | 9/2017 | Sekharan |
| 2017/0308571 A1* | 10/2017 | McCurley ............ G06F 16/2428 |
| 2018/0144064 A1* | 5/2018 | Krasadakis ........ G06F 16/90332 |
| 2018/0189294 A1* | 7/2018 | Anand .................. G06F 16/338 |
| 2019/0163807 A1 | 5/2019 | Jain et al. |
| 2019/0272296 A1* | 9/2019 | Prakash ............ G06F 16/90335 |
| 2020/0241903 A1 | 7/2020 | Wang et al. |
| 2020/0293167 A1 | 9/2020 | Blyumen |
| 2021/0004370 A1 | 1/2021 | Sekharan et al. |
| 2022/0172723 A1 | 6/2022 | Tendolkar |

OTHER PUBLICATIONS

Thom, Notice of Allowance, U.S. Appl. No. 17/583,164, dated Feb. 15, 2023, 23 pgs.

Atallah, Preinterview First Office Action, U.S. Appl. No. 16/940,267, dated Feb. 22, 2022, 6 pgs.

Atallah, First Action Interview Office Action, U.S. Appl. No. 16/940,267, dated Mar. 22, 2022, 5 pgs.

Atallah, Notice of Allowance, U.S. Appl. No. 16/940,267, dated Aug. 4, 2022, 7 pgs.

* cited by examiner

628 — When the user preference includes text and visualizations, generating and displaying a text response summarizing the one or more data visualizations along with the one or more data visualizations.

Figure 6C

630 — The type of question is "comparative." Generate a bar chart comparing one or more data fields of the data set.

632 — Identify the one or more data fields from the data set based on the analysis of the natural language command.

Figure 6D

634 — The type of question is "trend." Generate a trend chart for showing trends in a first data field of the data set 636 — In accordance with a determination, based on the user preference, that the additional context information is required, adding trends for one or more data fields of the data set related to the first data field

Figure 6E

644 — Analyze one or more responses from the user, in response to displayed visualizations and/or texts, to generate the user preference.

646 — Analyze responses from a plurality of users, in response to displayed visualizations and/or texts, to generate the user preference.

INCORPORATING DATA VISUALIZATIONS INTO DATABASE CONVERSATIONAL INTERFACES

RELATED APPLICATIONS

This application claims priority to U.S. Provisional Application Ser. No. 62/991,342, filed Mar. 18, 2020, entitled "Incorporating Data Visualizations into Database Conversational Interfaces," which is incorporated by reference herein in its entirety.

This application is related to U.S. patent application Ser. No. 15/804,991, filed Nov. 6, 2017, entitled "Systems and Methods of Using Natural Language Processing for Visual Analysis of a Data Set," which is incorporated by reference herein in its entirety.

This application is related to U.S. patent application Ser. No. 16/234,470, filed Dec. 27, 2018, entitled "Analyzing Underspecified Natural Language Utterances in a Data Visualization User Interface," which is incorporated by reference herein in its entirety.

This application is also related to U.S. patent application Ser. No. 16/221,413, filed Dec. 14, 2018, entitled "Data Preparation User Interface with Coordinated Pivots," which is incorporated by reference herein in its entirety.

This application is also related to U.S. patent application Ser. No. 16/236,611, filed Dec. 30, 2018, entitled "Generating Data Visualizations According to an Object Model of Selected Data Sources," which is incorporated by reference herein in its entirety.

This application is also related to U.S. patent application Ser. No. 16/236,612, filed Dec. 30, 2018, entitled "Generating Data Visualizations According to an Object Model of Selected Data Sources," which is incorporated by reference herein in its entirety.

This application is also related to U.S. patent application Ser. No. 16/679,234, filed Nov. 10, 2019, entitled "Data Preparation Using Semantic Roles," which is incorporated by reference herein in its entirety.

TECHNICAL FIELD

The disclosed implementations relate generally to conversational interfaces, and more specifically to systems, methods, and user interfaces to incorporate data visualizations into database conversational interfaces.

BACKGROUND

Conversational interfaces have become commonplace on mobile devices, helping users select music, get driving directions, and answer informational questions. Conversational interfaces provide significant improvements in efficiency over conventional methods (e.g., emails). Chat interfaces are likely to become the preferred user interface for many of the activities to which users have grown accustomed to performing through a webpage or a dedicated application. In the field of information visualization, however, little is known about the most appropriate response to questions about data when posed in a conversational user interface. Moreover, user preferences vary as to the appropriateness of the presentation of charts and graphs in the context of a computer-mediated chat-style conversation. Also, current systems do not integrate visualizations and natural language processing in conversational interfaces.

SUMMARY

Disclosed implementations provide methods to automatically generate and display data visualizations in conversational interfaces.

In accordance with some implementations, a method incorporates data visualization in conversational interfaces. The method receives a user input specifying a natural language command via a conversational interface. The method analyzes the natural language command to determine the type of question. The method also obtains a user preference for viewing responses based on text and/or visualizations. The method determines if the user preference includes visualizations. The method then determines if the type of question is answerable using data visualizations. When the user preference includes visualizations and the type of question is answerable using data visualizations, the method performs a sequence of steps. The sequence of steps includes extracting one or more independent analytic phrases from the natural language command. The sequence of steps also includes querying the database using a set of queries based on the extracted analytic phrases, thereby retrieving a data set, and generating and displaying, in the conversational interface, a response incorporating one or more data visualizations, based on the type of question, using the data set.

In some implementations, the type of question is one of: comparative questions, superlative questions, and trend questions.

In some implementations, the method further includes, when the user preference includes text and visualizations, generating and displaying a text response summarizing the one or more data visualizations along with the one or more data visualizations.

In some implementations, the type of question is comparative questions, and the method further includes generating a bar chart comparing one or more data fields of the data set. In some implementations, the method further includes identifying the one or more data fields from the data set based on the analysis of the natural language command.

In some implementations, the method further includes analyzing one or more predetermined responses from the user, in response to displayed visualizations and/or texts, to generate the user preferences.

In some implementations, the method further includes analyzing one or more predetermined responses from a plurality of users, in response to displayed visualizations and/or texts, to generate the user preferences.

In some instances, the type of question asks for a trend, and the method further includes generating a trend chart showing trends in a first data field of the data set. In some implementations, the method further includes determining, based on the user preferences, if additional context information is required. When additional context information is required, the method adds trends for one or more data fields of the data set related to the first data field.

In some implementations, the method further includes, when the user preference does not include visualizations and the type of question is answerable by data visualizations: (i) generating and displaying text that summarizes the data set and (ii) providing one or more prompts for the user to select a subset of data visualizations from one or more data visualizations. In some implementations, the method further includes generating and displaying a text summary of the one or more data visualizations.

In some implementations, the method further includes, when the user preference includes text: (1) determining the level of brevity for a text response to the natural language command, based on the user preference; and (2) generating and displaying the text response, based on the type of question and the level of brevity, using the data set.

In some implementations, a computer system has one or more processors, memory, and a display. The one or more programs include instructions for performing any of the methods described herein.

In some implementations, a non-transitory computer readable storage medium stores one or more programs configured for execution by a computer system having one or more processors, memory, and a display. The one or more programs include instructions for performing any of the methods described herein.

Thus, methods, systems, and graphical user interfaces are disclosed that enable users to ask questions about data in a conversational interface.

BRIEF DESCRIPTION OF THE DRAWINGS

For a better understanding of the aforementioned systems, methods, and graphical user interfaces, as well as additional systems, methods, and graphical user interfaces that provide data visualization analytics and data preparation, reference should be made to the Description of Implementations below, in conjunction with the following drawings, in which like reference numerals refer to corresponding parts throughout the figures.

FIGS. 6A-6I provide a flowchart of a process that incorporates data visualizations into conversational interfaces, according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1A:
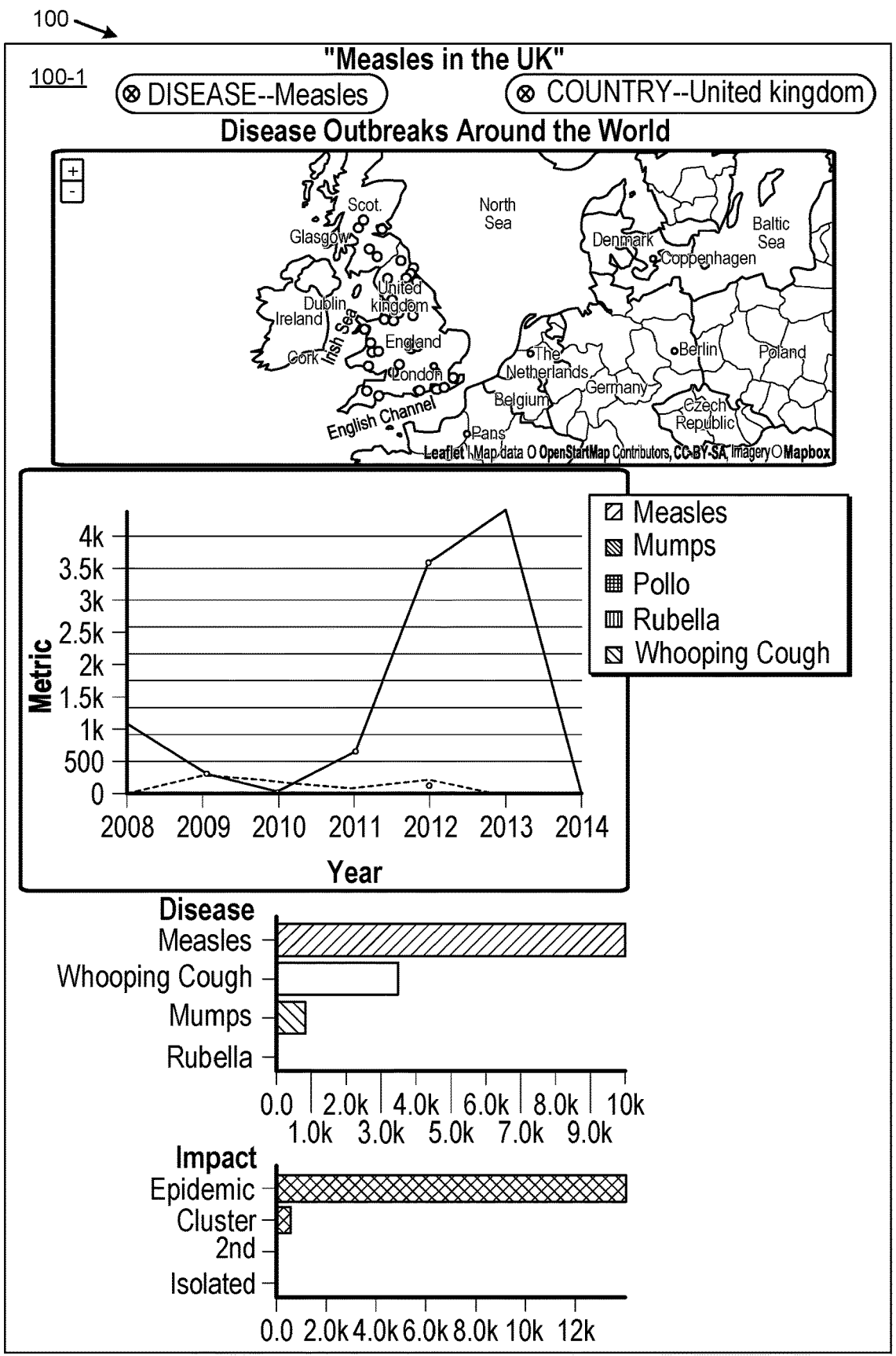
FIGS. 1A, 1, and 1C illustrate example user interfaces used in some implementations.
Figure 1B:
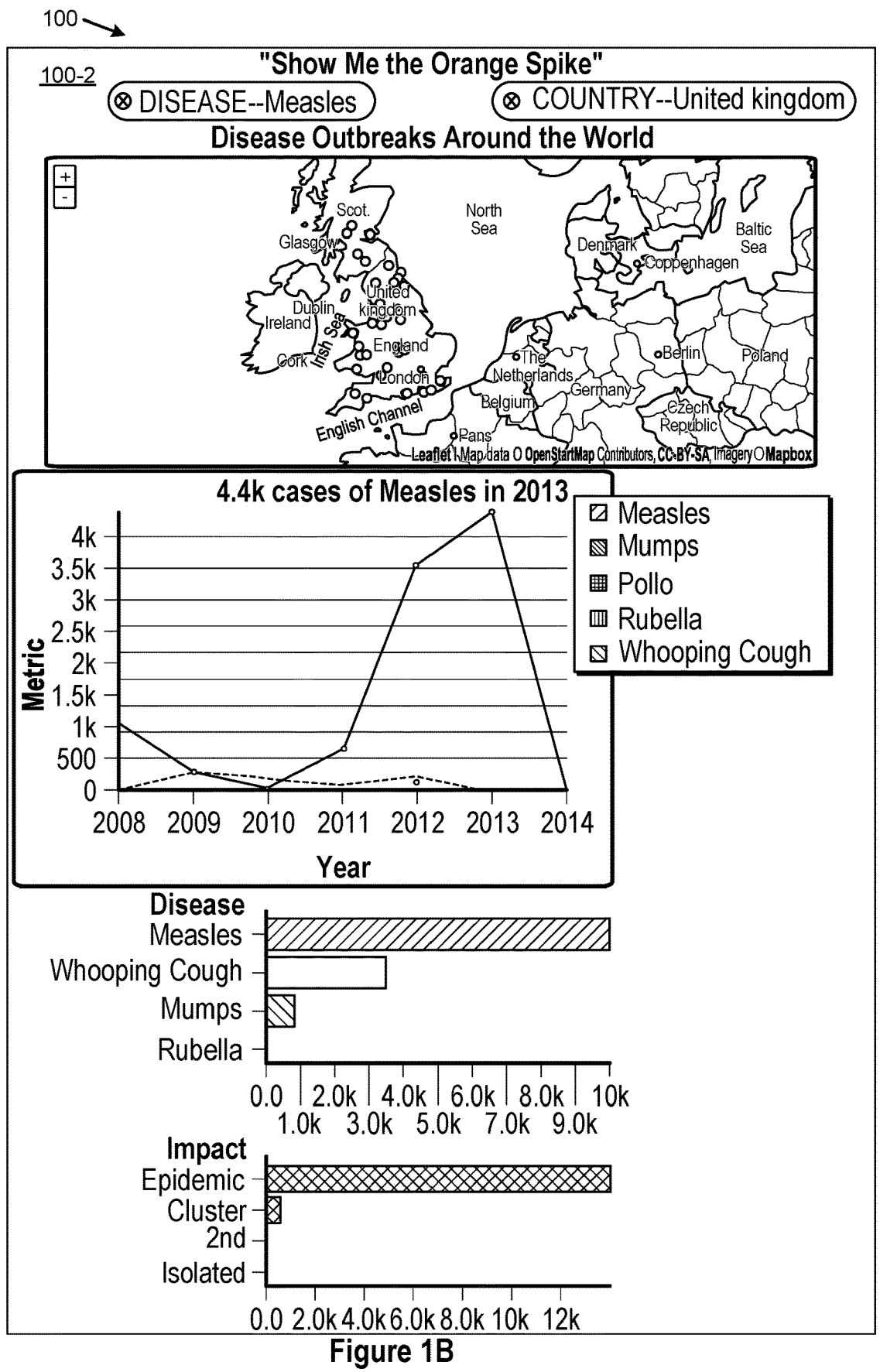
Figure 1C:
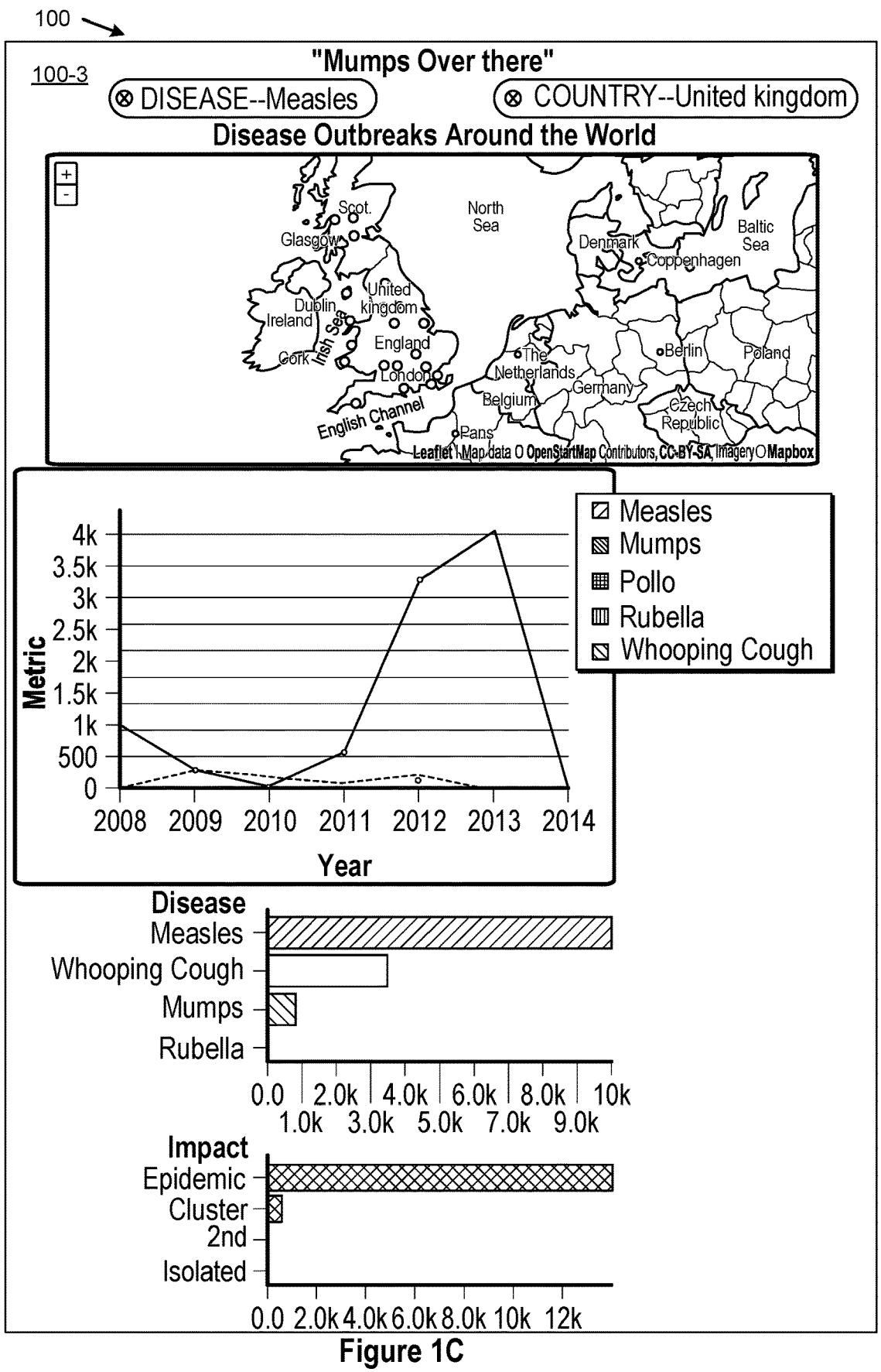

FIGS. 1A, 1i, and 1C illustrate various data visualization interfaces 100 (e.g., data visualization interface 100-1, 100-2, and 100-3) in accordance with some implementations. The data visualization interfaces 100 (sometimes called user interfaces) can be used to search for data fields and/or values of data fields (sometimes called data entities) in published data sources. In some implementations, the user interfaces 100 provides a search field that enables a user to search for data entities. Some implementations provide various options or affordances to search different types and/or different levels of information about data in data sources, or to switch between data sources. Some implementations provide a search bar to ask about fields in a data source. Some implementations provide example questions to ask. Some implementations provide basic data analysis related questions, date and time information related questions, filters, and/or visualization type. Some implementations provide these capabilities for one or more sheets. Some implementations provide an option to add additional sheets. In this way, some interfaces provide users with options or suggestions to ask natural language queries to query data sources. The suggestions for queries are automatically generated according to some implementations.

Figure 2:
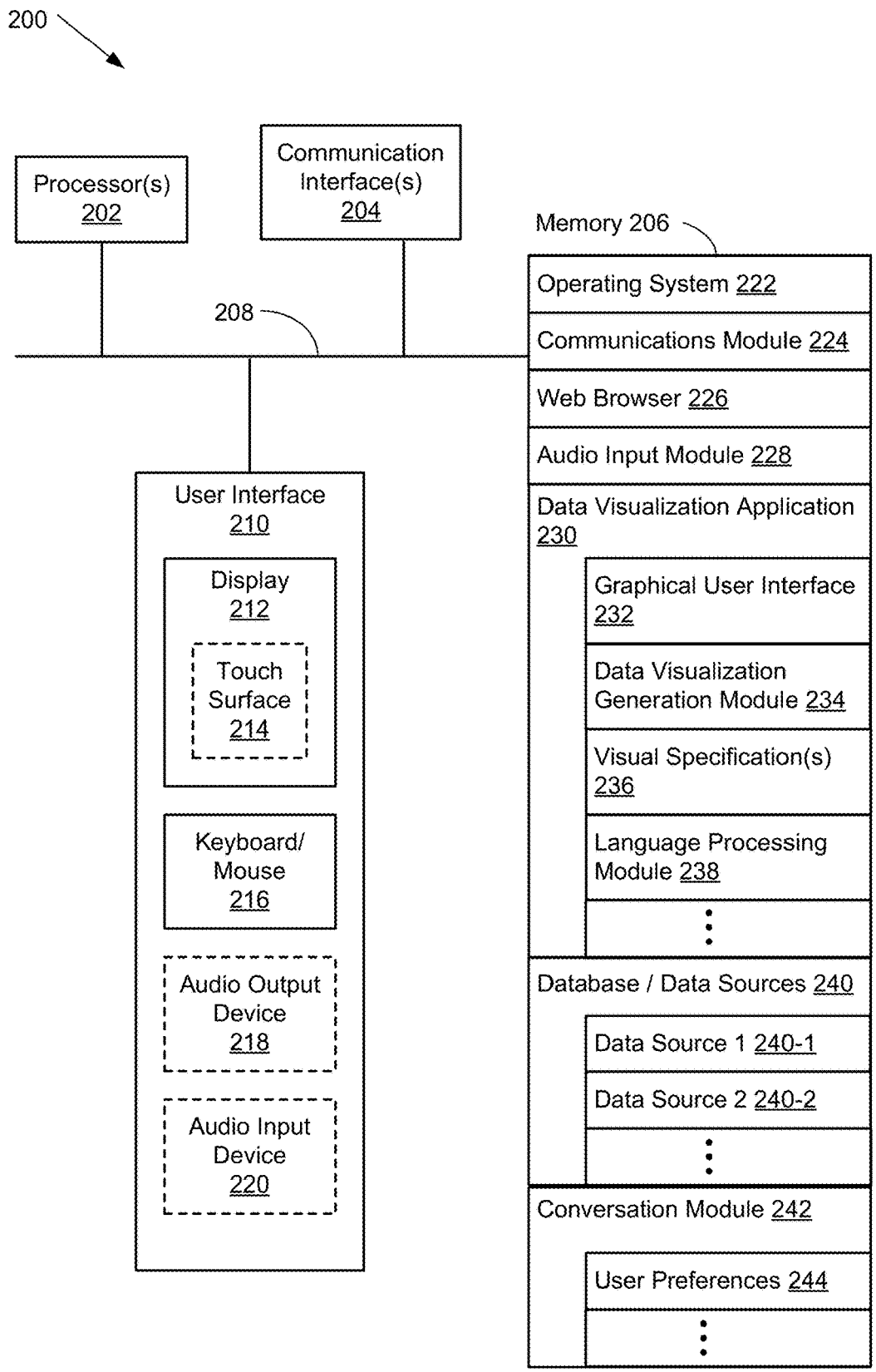
FIG. 2 is a block diagram of a computing device in accordance with some implementations.

FIG. 2 is a block diagram illustrating a computing device 200 that can display the graphical user interfaces 100 in accordance with some implementations. Various examples of the computing device 200 include a desktop computer, a laptop computer, a tablet computer, and other computing devices that have a display and a processor capable of running a data visualization application 230 and/or a data prep application. The computing device 200 typically includes one or more processing units/cores (CPUs) 202 for executing modules, programs, and/or instructions stored in the memory 206 and thereby performing processing operations; one or more network or other communications interfaces 204; memory 206; and one or more communication buses 208 for interconnecting these components. The communication buses 208 may include circuitry that interconnects and controls communications between system components.

The computing device 200 includes a user interface 210 comprising a display device 212 and one or more input devices or mechanisms. In some implementations, the input device/mechanism includes a keyboard and/or mouse 216. In some implementations, the input device/mechanism includes a "soft" keyboard, which is displayed as needed on the display device 212, enabling a user to "press keys" that appear on the display 212. In some implementations, the display 212 and input device or mechanism comprise a touch screen display 214 (also called a touch sensitive display). In some implementations, the user interface includes an audio output device 218, such as speakers, and/or an audio input device 220, such as a microphone.

In some implementations, the memory 206 includes high-speed random access memory, such as DRAM, SRAM, DDR RAM or other random access solid state memory devices. In some implementations, the memory 206 includes non-volatile memory, such as one or more magnetic disk storage devices, optical disk storage devices, flash memory devices, or other non-volatile solid state storage devices. In some implementations, the memory 206 includes one or more storage devices remotely located from the CPU(s) 202. The memory 206, or alternatively the non-volatile memory devices within the memory 206, comprises a non-transitory computer readable storage medium. In some implementations, the memory 206, or the computer readable storage medium of the memory 206, stores the following programs, modules, and data structures, or a subset thereof:

an operating system 222, which includes procedures for handling various basic system services and for performing hardware dependent tasks;

a communications module 224, which is used for connecting the computing device 200 to other computers and devices via the one or more communication network interfaces 204 (wired or wireless) and one or more communication networks, such as the Internet, other wide area networks, local area networks, metropolitan area networks, and so on;

- a web browser 226 (or other application capable of displaying web pages), which enables a user to communicate over a network with remote computers or devices;
- an audio input module 228, which processes audio signals received by an audio input device 220, such as a microphone;
- a data visualization application 230, which provides a data visualization user interface 232 (e.g., the graphical user interface 100) for a user to construct visual graphics and/or ask natural language queries. For example, a user selects one or more data sources 240 (which may be stored on the computing device 200 or stored remotely), selects data fields from the data sources and/or searches for data fields from the data sources that match a natural language query, and uses the selected fields to define a visual graphic. In some implementations, the information the user provides is stored as a visual specification 236. The data visualization application 230 includes a data visualization generation module 234, which takes the user input (e.g., the visual specification 236), and generates a corresponding visual graphic (also referred to as a "data visualization" or a "data viz"). The data visualization application 230 then displays the generated visual graphic in the user interface 100. In some implementations, the data visualization application 230 executes as a standalone application (e.g., a desktop application). In some implementations, the data visualization application 230 executes within the web browser 226 or another application using web pages provided by a web server. In some implementations, the data visualization application 230 includes a language processing module 238 for processing (e.g., interpreting) commands provided by a user of the computing device. In some implementations, the commands are natural language commands (e.g., captured by an audio input device 220). In some implementations, the language processing module 238 includes sub-modules such as an autocomplete module, a pragmatics module, and/or an ambiguity module. In some implementations, the memory 206 stores metrics and/or scores determined by the language processing module 238. In addition, the memory 206 may store thresholds and other criteria, which are compared against the metrics and/or scores determined by the language processing module 238. For example, the language processing module 238 may determine a relatedness metric for an analytic word/phrase of a received command. Then, the language processing module 238 may compare the relatedness metric against a threshold stored in the memory 206;
- zero or more databases or data sources 240 (e.g., a first data source 240-1 and a second data source 240-2), which are used by the data visualization application 230. In some implementations, the data sources are stored as spreadsheet files, CSV files, XML files, or flat files, or stored in a relational database; and
- a conversation module 242, which processes user input via a conversational interface (e.g., the interfaces described below in reference to FIGS. 3A-3D, FIGS. 4A-4D, and/or FIGS. 5A-5D), and generates text and/or visualization responses based on question types and/or user preferences 244. The user preferences 244 may include preference for text versus visualizations, text plus visualizations, text only, visualizations only, according to some implementations. In various implementations, the user preferences 244 include length of text or amount of context to be displayed in response to questions, preferences for portrait versus landscape views, and/or preference for different types of visualizations (e.g., bar chart versus line graph). In some implementations, the user preferences 244 also store historical data for a user and/or a plurality of users (which may include a specific user). Such data may be tracked by the conversation module 242, for one or more sessions, for one or more users, according to some implementations. In some implementations, historical usage data may be used to analyze user behavior and/or preferences over multiple sessions, over a single session, for one or more users, and/or adjusted dynamically (e.g., as a user preference 244 changes during data exploration, or as a result of an implicit or explicit user response).

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Appropriateness of Visualization Responses and User Preferences

Some implementations analyze user responses to visualizations to investigate the appropriateness of visualization responses within a chat-bot style interaction with data. Some implementations examine user responses to automatically generated text versus automatically generated text plus visualization responses within the context of a chat-style conversation. Some implementations use information obtained via this analysis to determine the level of information that is appropriate, as further described below.

Some implementations present different sets of stimuli to participants. A first experiment asked comparison questions, while a second experiment asked trend and superlative questions. Participants engaged in a conversation with a chat-bot, and the system (or a human operator) recorded and/or analyzed user views of the appropriateness of the responses.

Some implementations refine the stimuli, tasks and questions over a series of pilot studies. Participants vary in their preferences about the appropriateness of showing charts in response to questions. Some implementations evaluate user preferences by coding the most frequent reasons and compressing the reasons into two questions, presenting the responses on a Likert agreement scale from strongly disagree through strongly agree:

- The view I selected provides exactly the information I asked for and nothing else.
- The view I selected provides additional information beyond what I asked for that is potentially relevant.

Some implementations evaluate valence statements from users about charts, and categorize the statements as positive or negative. Some implementations analyze user responses to determine the reason for a user's preference (e.g., preferring text to data visualizations) and generate future responses accordingly.

Example Data Visualizations and/or Text Responses for Natural Language Queries

Figure 3A:
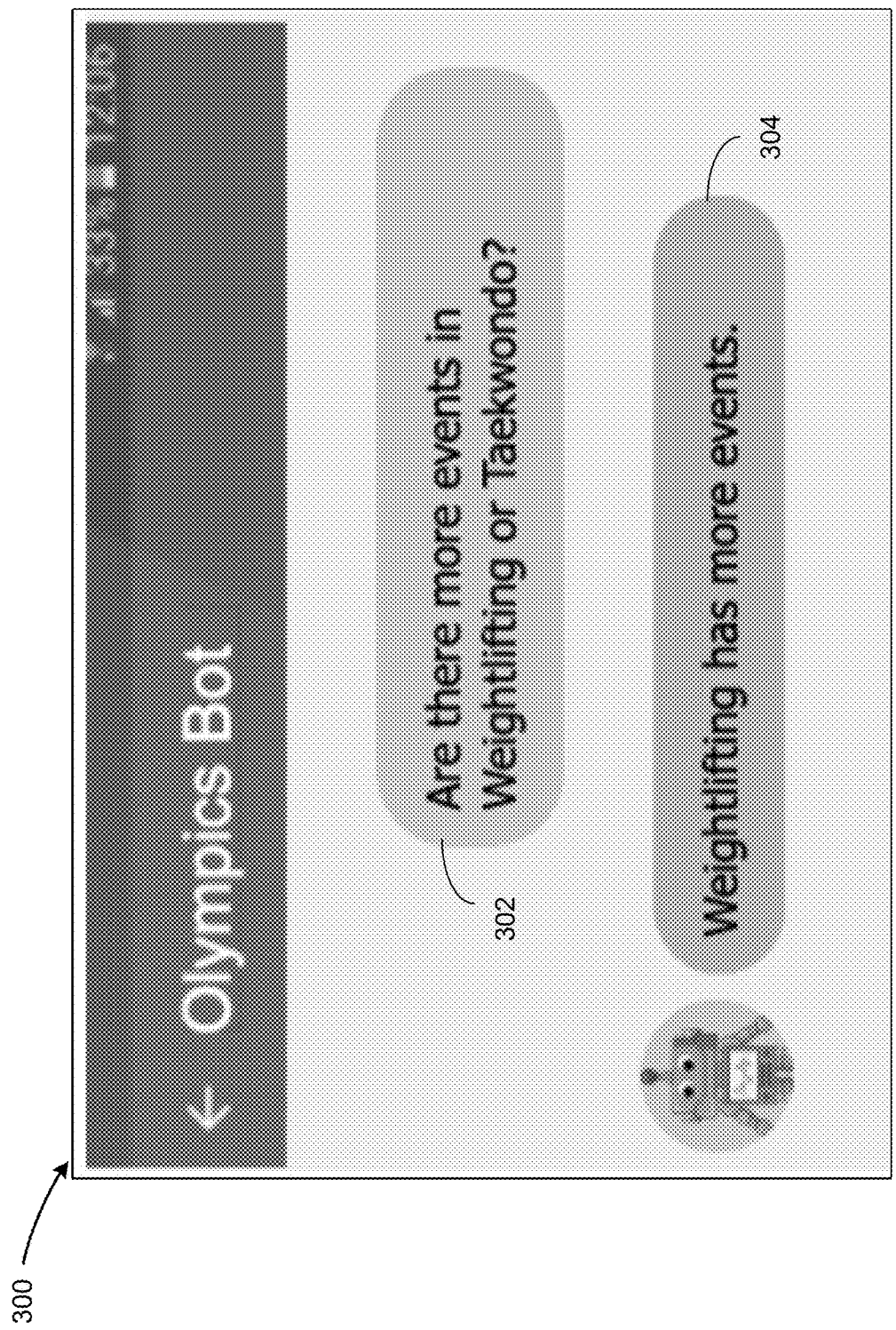
FIGS. 3A-3D illustrate example conversational interfaces and responses for a comparison question, according to some implementations.
Figure 3B:
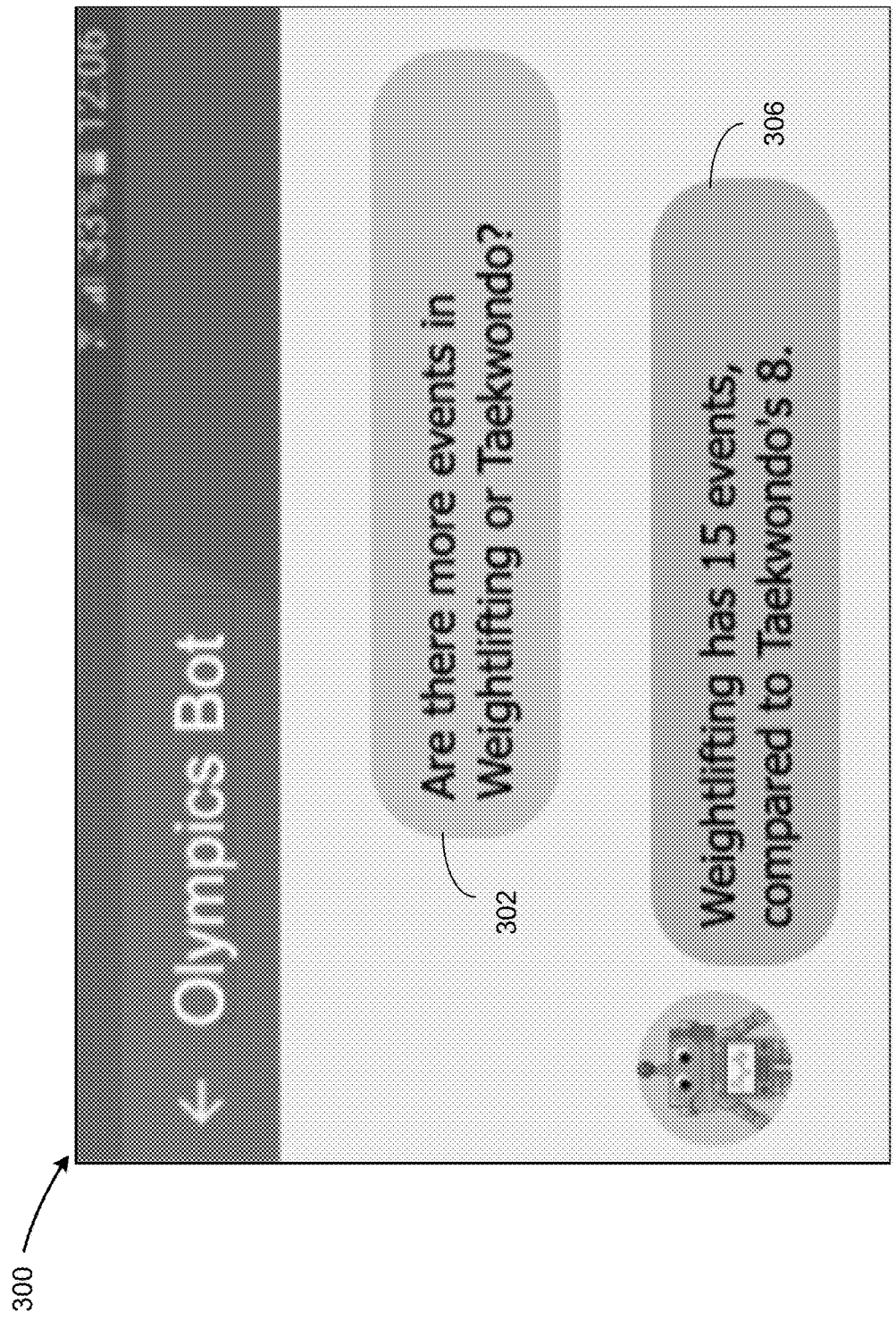
Figure 3C:
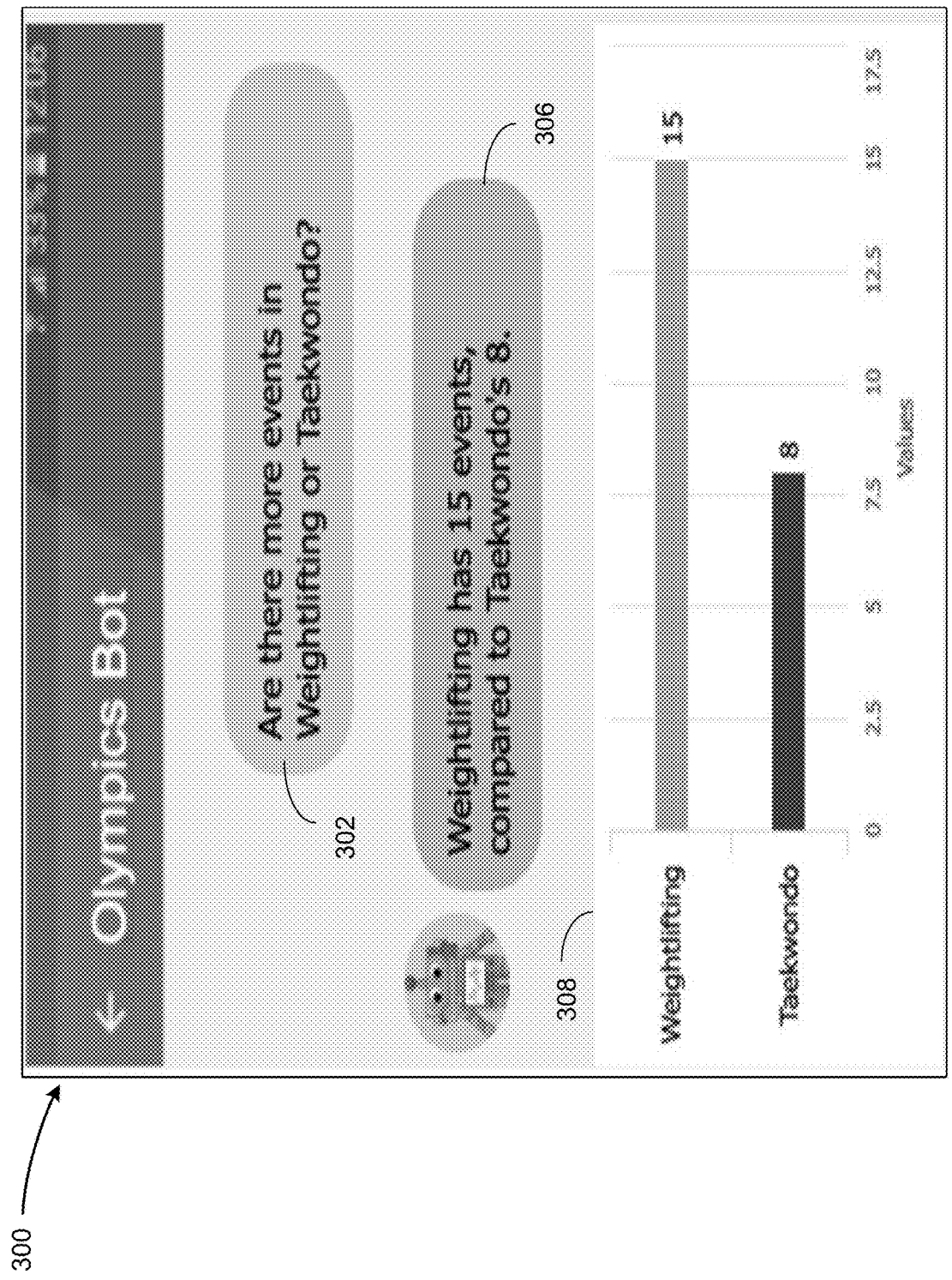
Figure 3D:
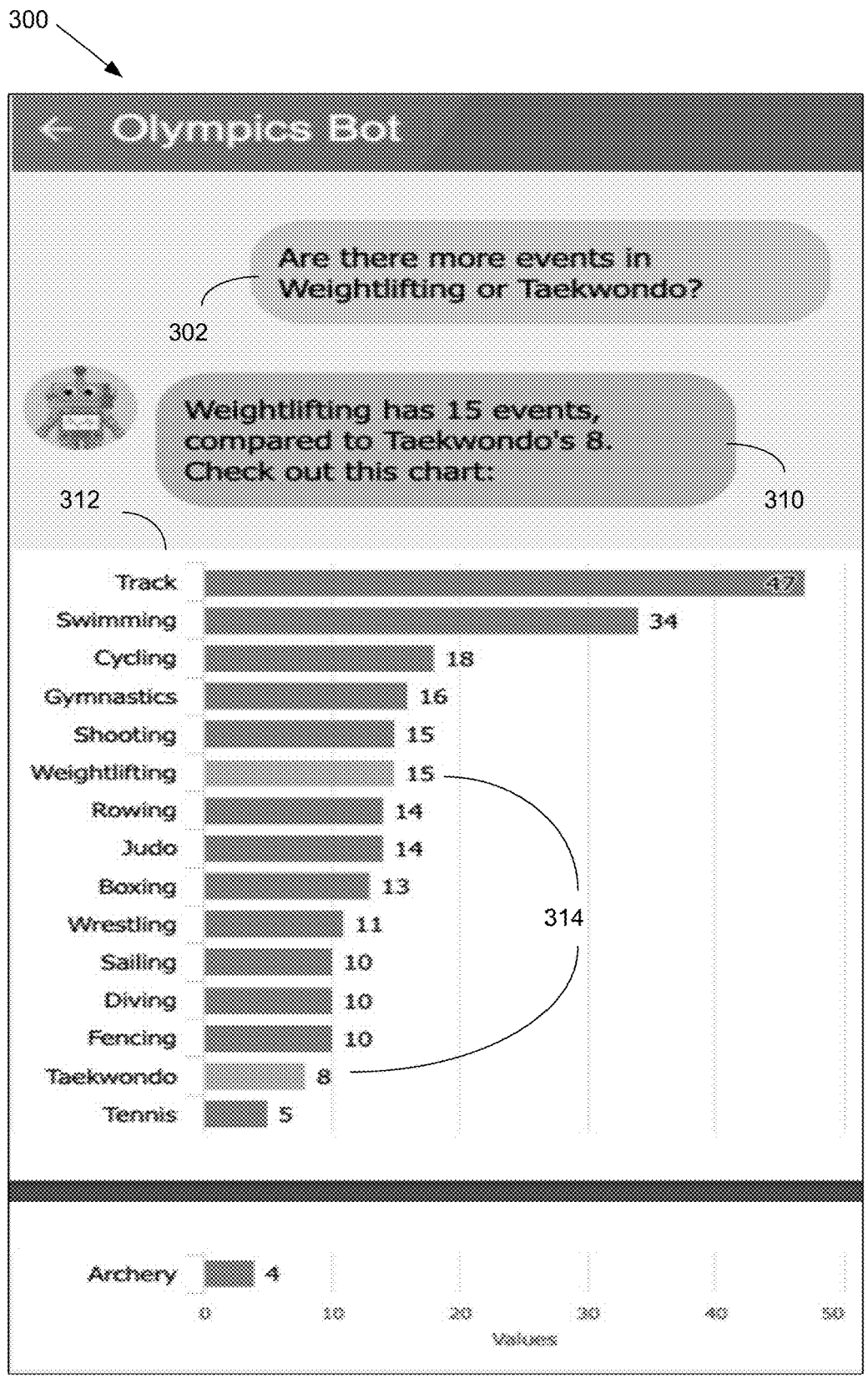

FIG. 3A-3D illustrate example conversational interface and responses for a comparison question, according to some implementations. FIG. 3A shows a conversational interface 300, according to some implementations. The example shows a user asking a question 302 ("Are there more events in Weightlifting or Taekwondo?"). Based on user preferences, and the question, the system may respond with a simple text response 304 ("Weightlifting has more events"). Suppose the system knows that the user prefers longer messages or more context than brief messages, the system may produce a longer response, such as the text 306 ("Weightlifting has 15 events, compared to Taekwondo's 8") shown in FIG. 3B. In some instances, for generating the text, the system generates a query corresponding to a natural language command or question asked by the user, queries an underlying database to retrieve values for one or more data fields (e.g., number of events corresponding to Weightlifting or Taekwondo), and uses the values retrieved to generate the text. Next, suppose the user preferences show that the user prefers a data visualization along with a textual response. the system generates and displays a data visualization response for the question, along with the text response. This example is shown in FIG. 3C. In addition to the text response 306, the conversational interface 300 also shows a bar chart 308 with one bar for each of the compared values (Weightlifting and Taekwondo, in the current example). Suppose further that the user preferences indicate that the user prefers more context or details regarding the comparison, with the data visualization. Based on the user preference, some systems generate and display more context (e.g., sixteen items of context shown in the bar chart 312, in FIG. 3D) along with an appropriate text response (e.g., the response 310 that indicates "Check out this chart:"). Some implementations also highlight target items so the user can quickly spot relevant items. For example, in FIG. 3D, items Weightlifting and Taekwondo are shown in a different color 314.

Figure 4A:
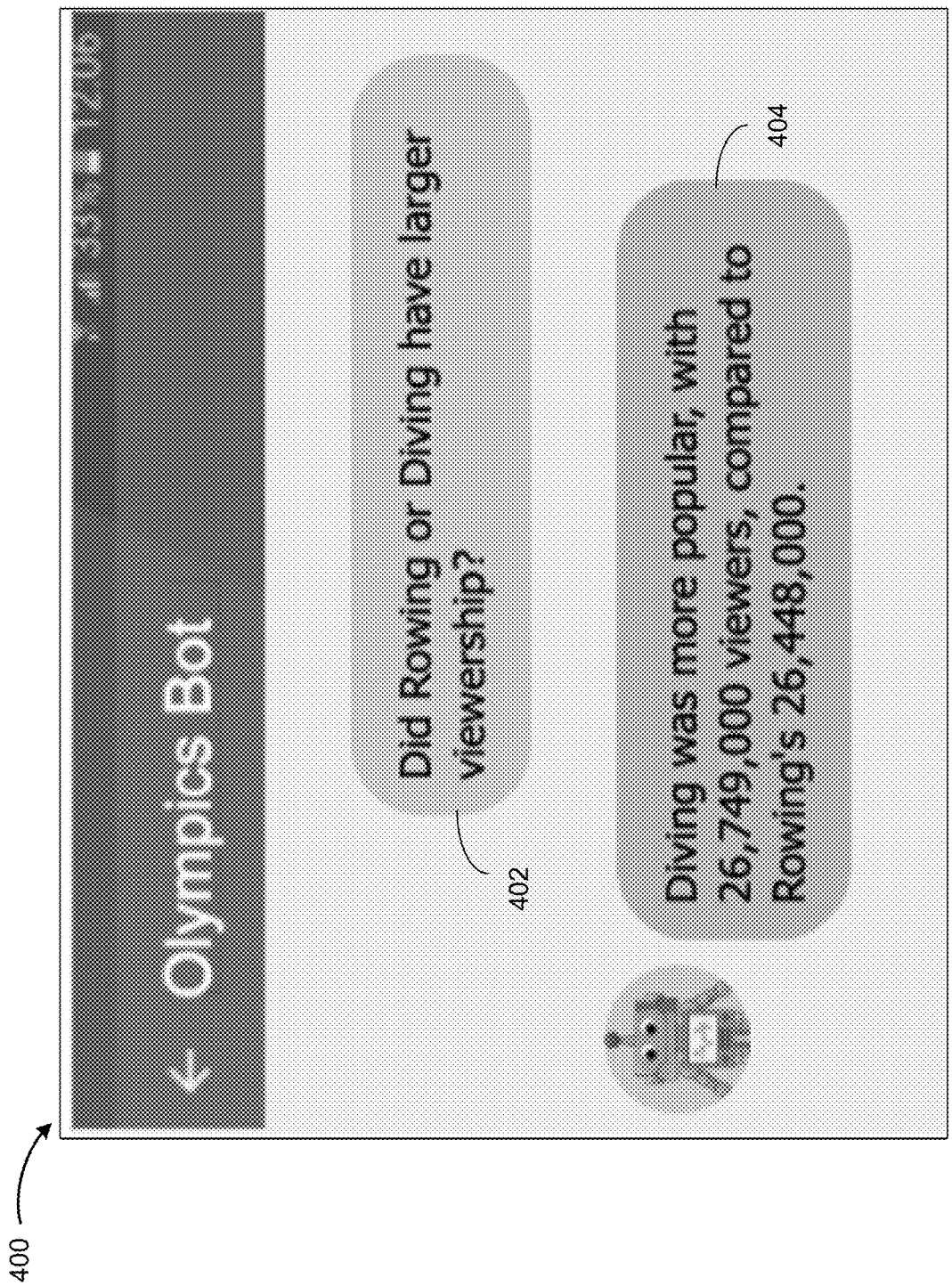
FIGS. 4A-4D illustrate example conversational interfaces and responses for a superlative question, according to some implementations.
Figure 4B:
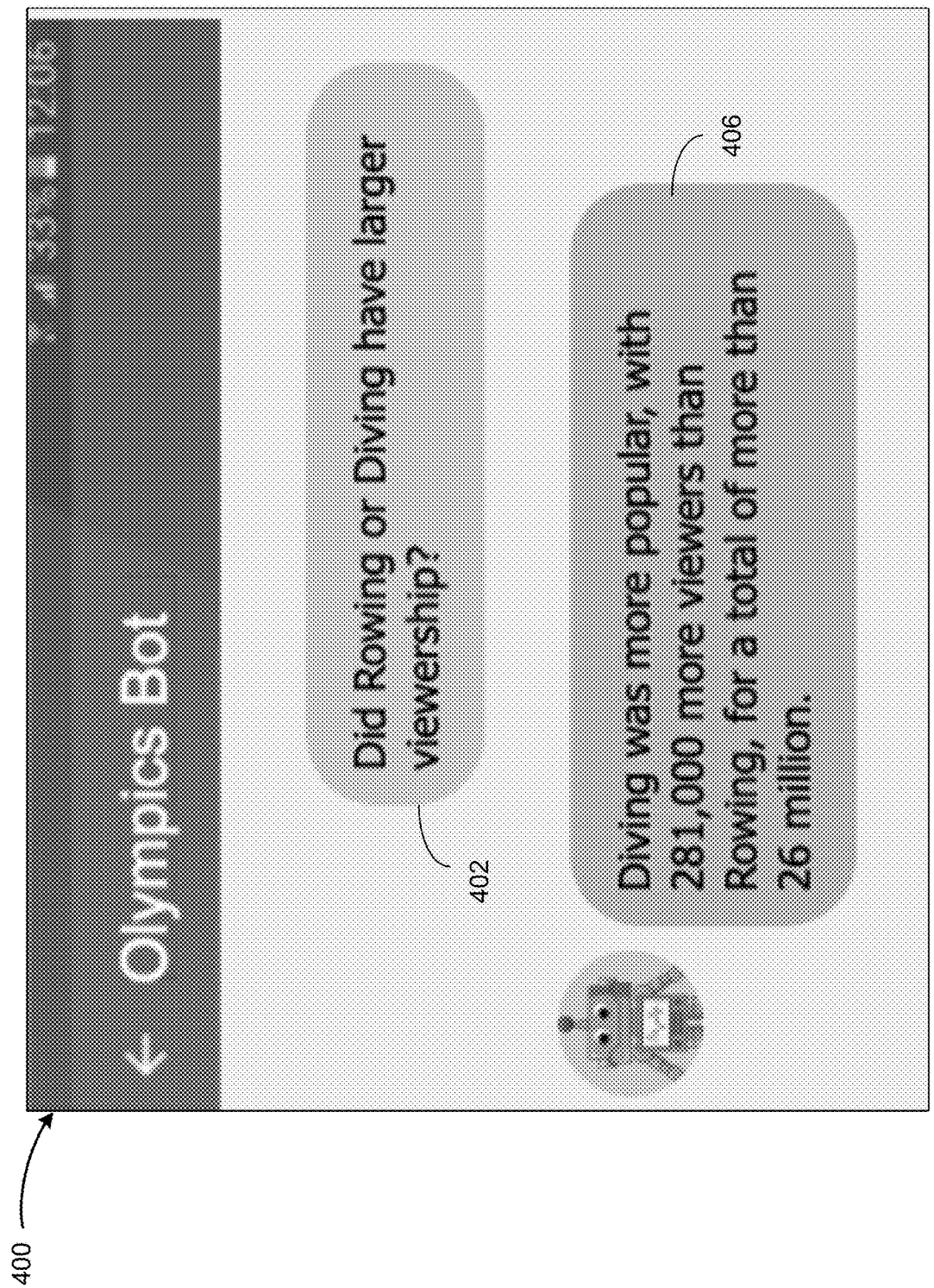
Figure 4C:
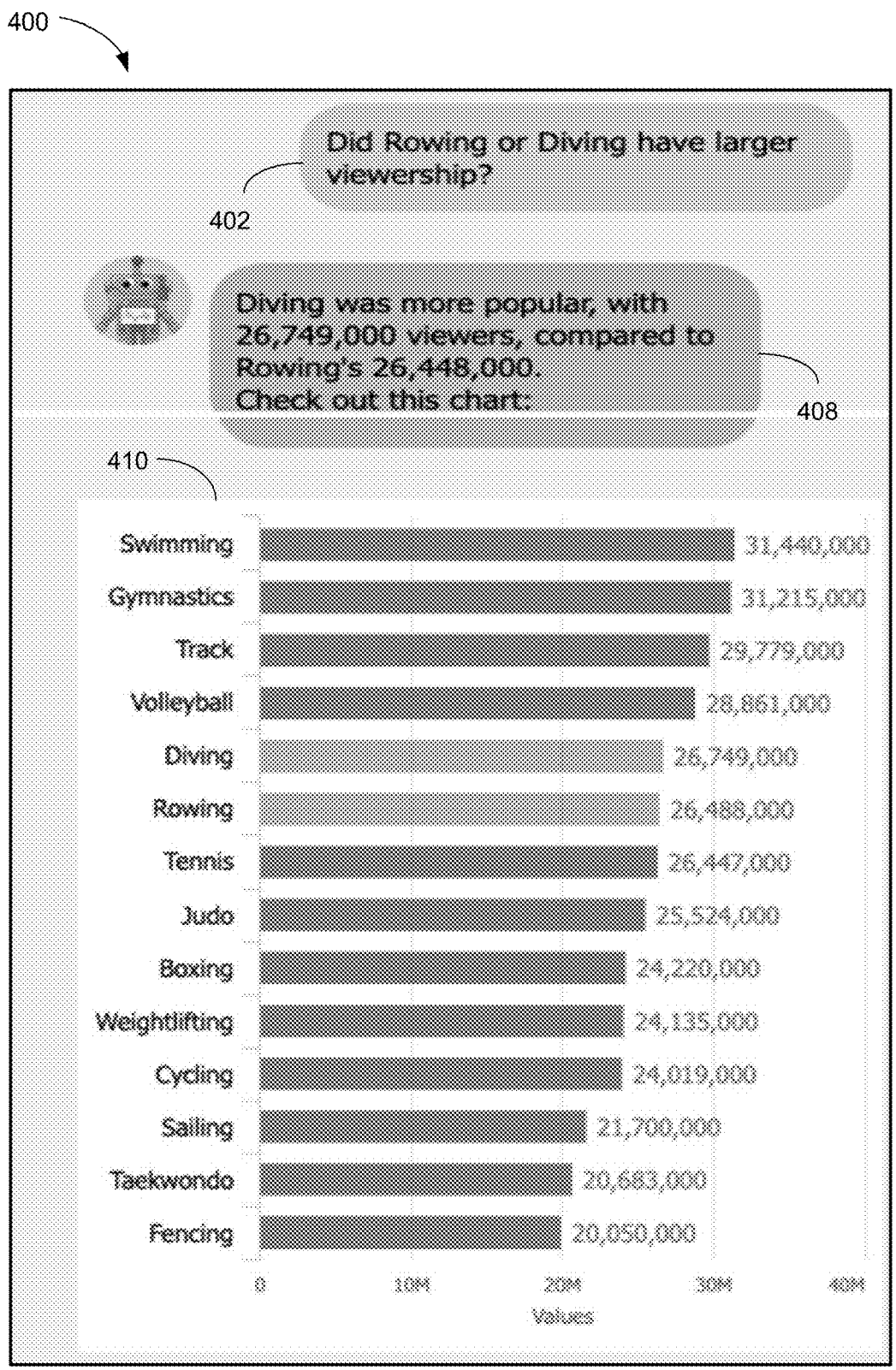
Figure 4D:
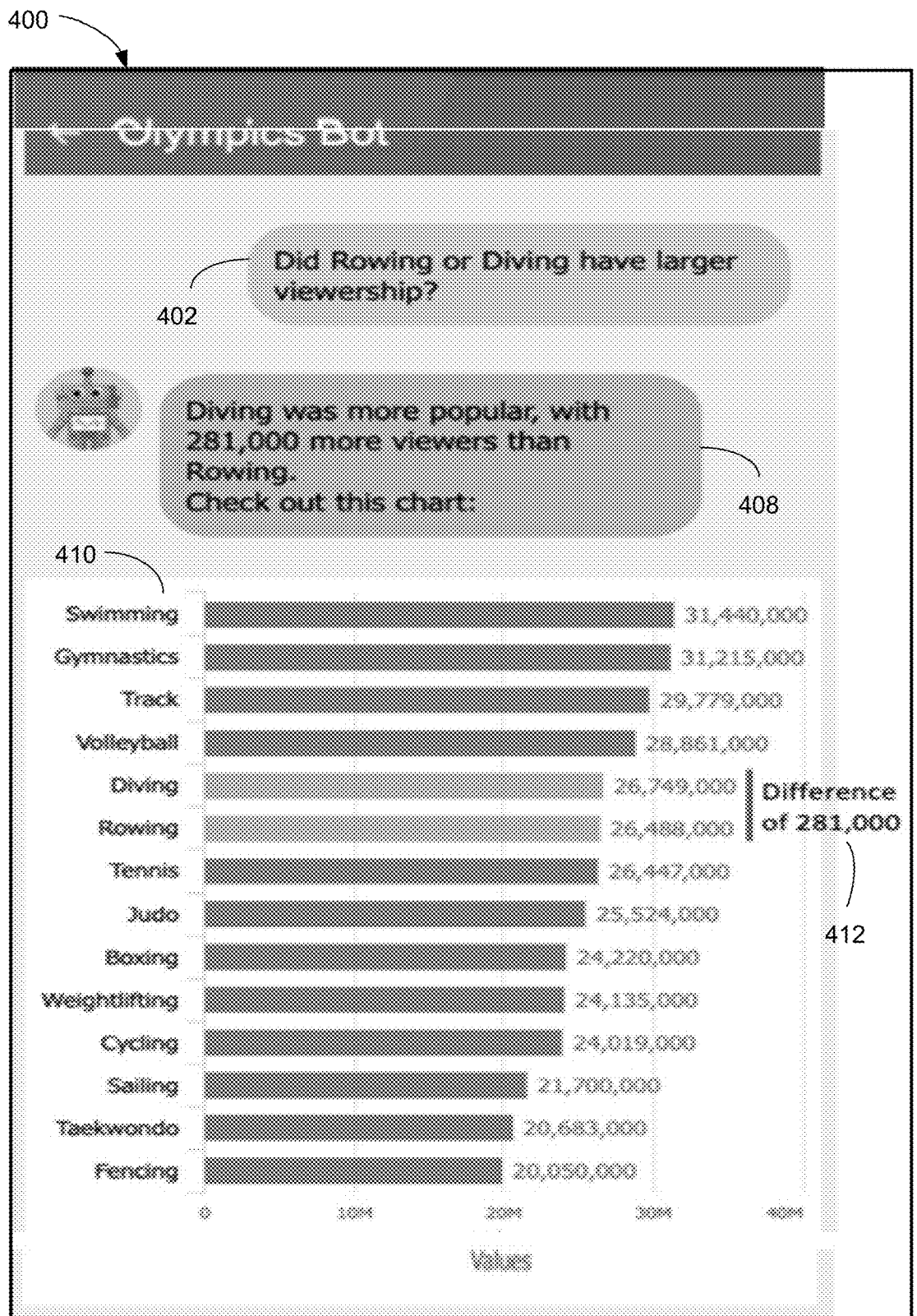

FIG. 4A-4D illustrate an example conversational interface and responses for a superlative question, according to some implementations. FIG. 4A shows a conversational interface 400, according to some implementations. The example shows a user asking a question 402 ("Did Rowing or Diving have larger viewership?"). Based on user preferences, and the question, the system may respond with a simple text response 404 ("Diving was more popular, with 26,749,000 viewers, compared to Rowing's 26,448,000"). Suppose the system knows that the user prefers longer messages or more context than brief messages. The system may produce a longer response, such as the text 406 ("Diving was more popular, with 281,000 more viewers than Rowing, for a total of more than 26 million") shown in FIG. 4B. In some instances, for generating the text, the system generates a query corresponding to a natural language command or question asked by the user, queries an underlying database to retrieve values for one or more data fields (e.g., the number of events corresponding to Weightlifting or Taekwondo), and uses the values retrieved to generate the text. Next, suppose the user preferences show that the user prefers a data visualization along with a textual response. The system generates and displays a data visualization response for the question, along with the text response. This example is shown in FIG. 4C. In addition to the text response 408, the conversational interface 400 also shows a bar chart 410 with one bar for each of the compared data fields. Suppose further that the user preferences indicate that the user prefers more context or details regarding the comparison, with the data visualization. Based on the user preference, some systems generate and display more context (e.g., fourteen bars with values closer together, and differences called out with an annotation 412 as well as highlighting, as shown in FIG. 4D).

Figure 5A:
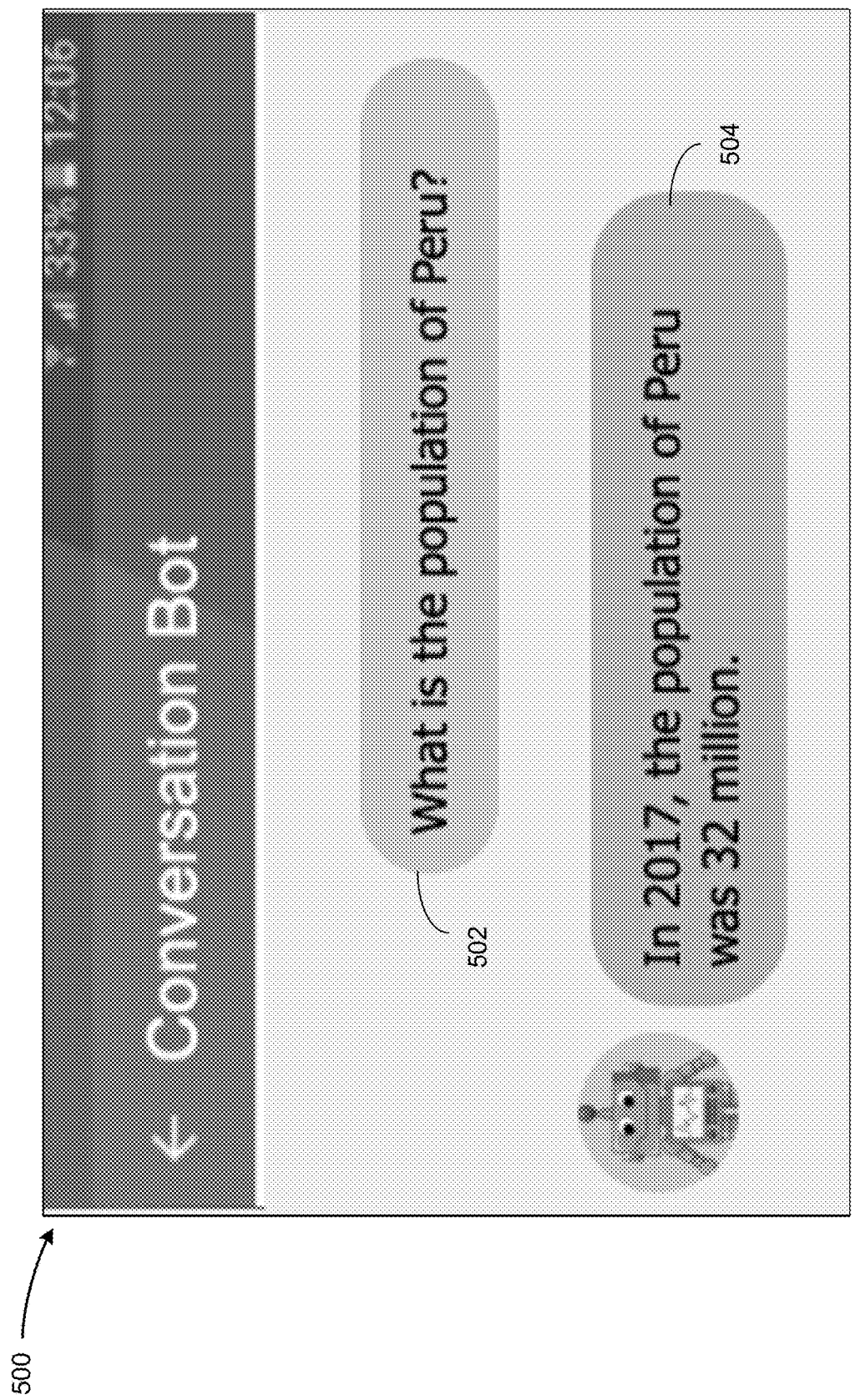
FIG. 5A-5D illustrate example conversational interfaces and responses for a trend question, according to some implementations.
Figure 5B:
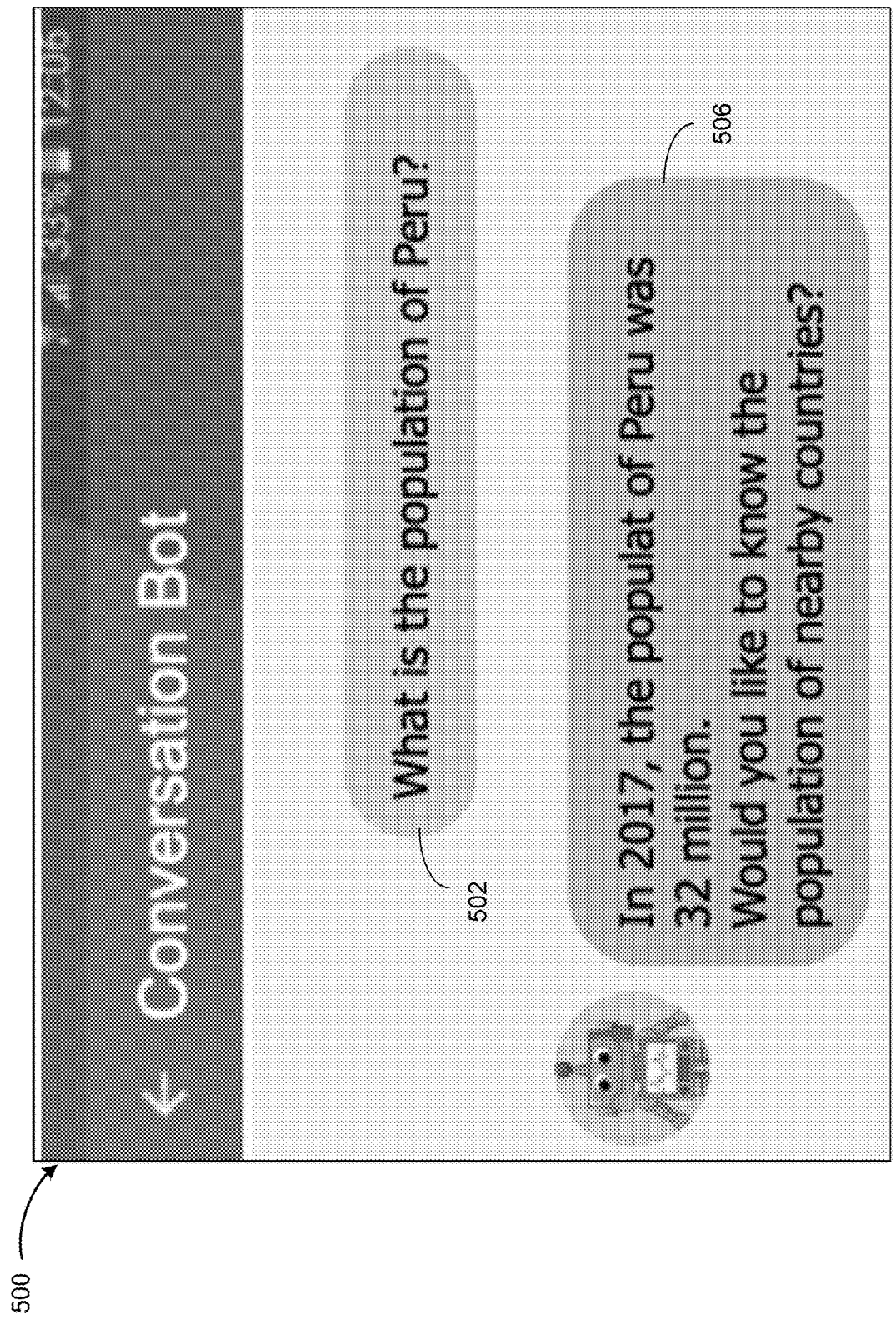
Figure 5C:
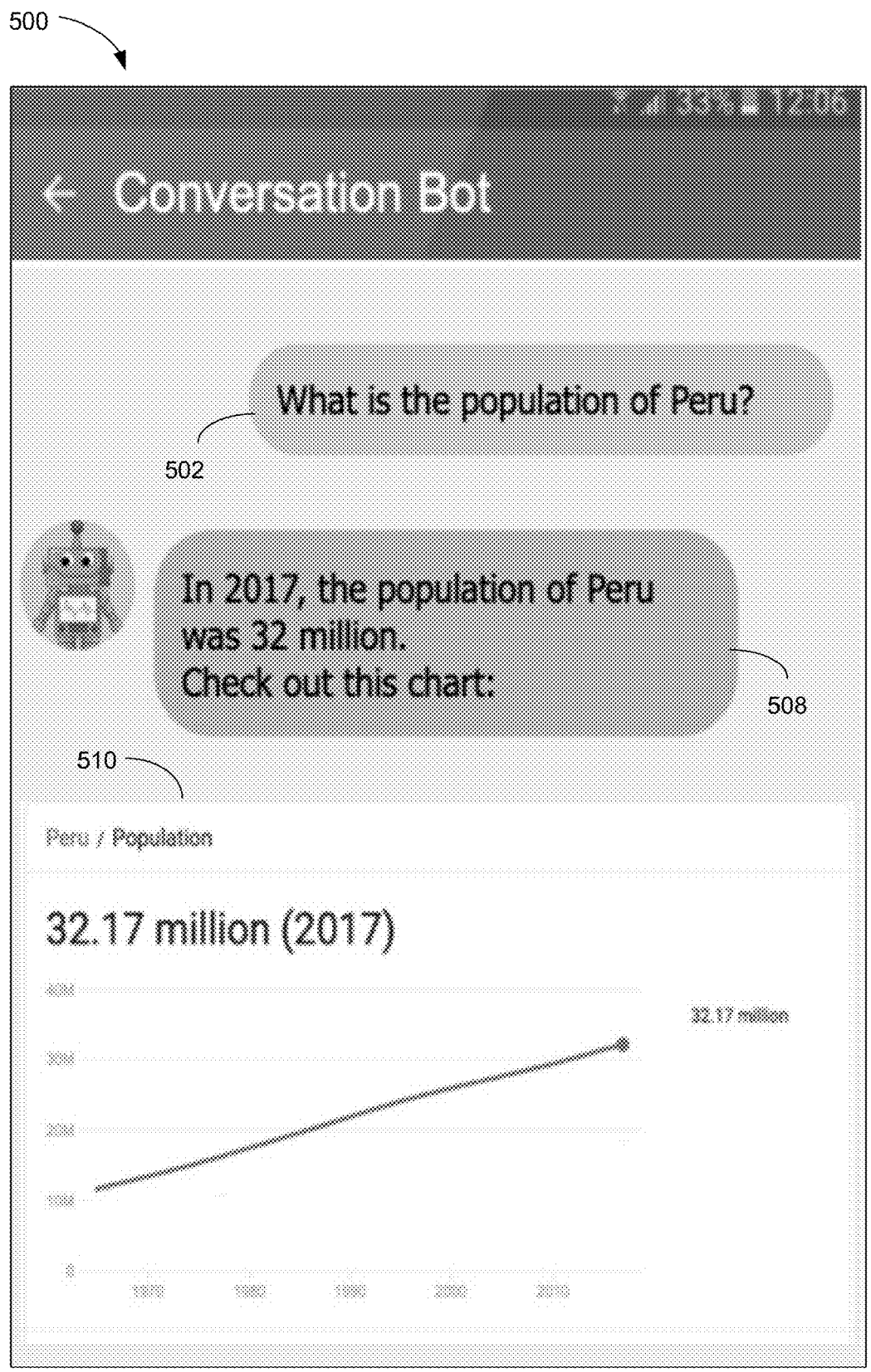
Figure 5D:
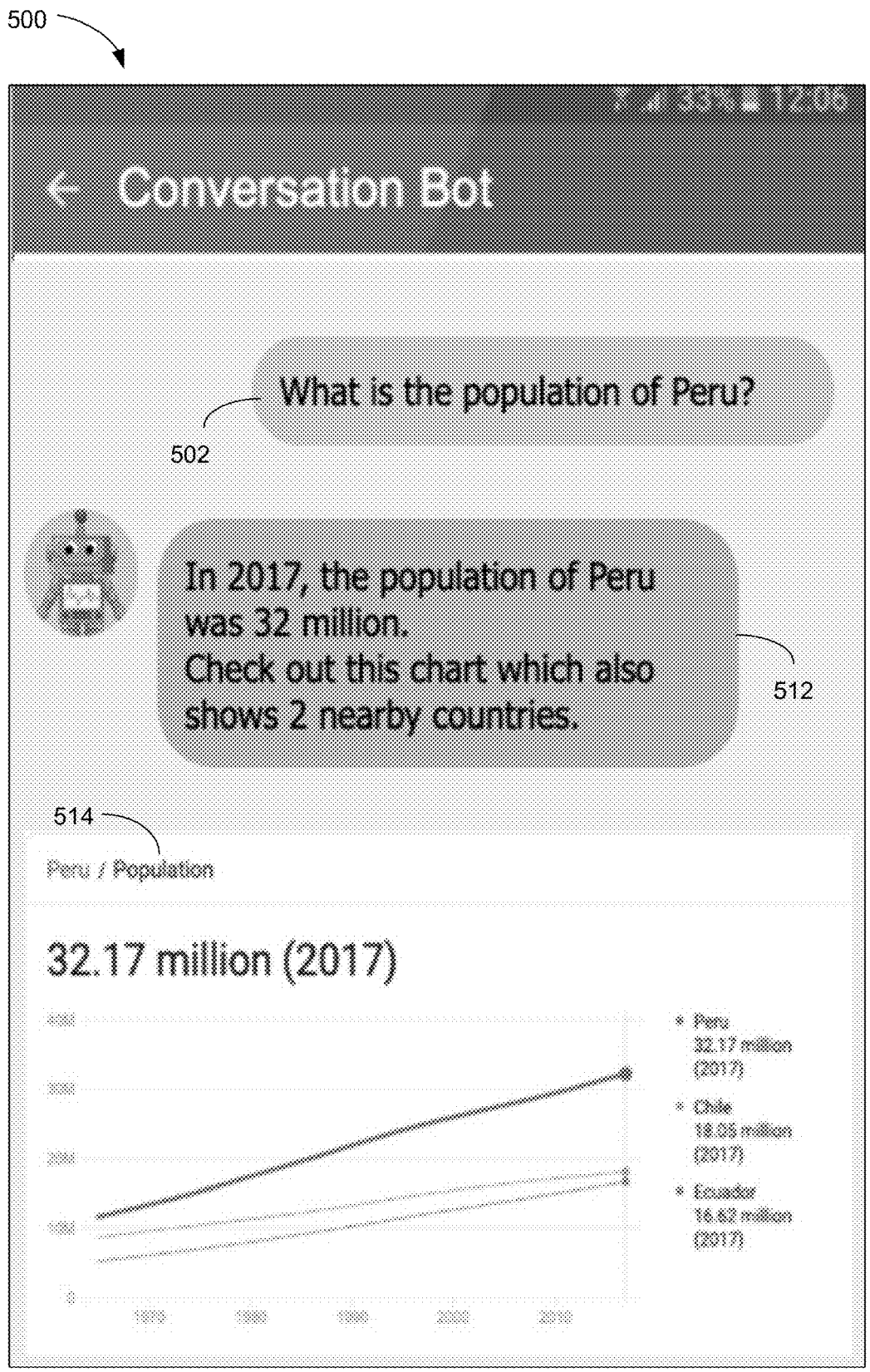

FIG. 5A-5D illustrate an example conversational interface and responses for a trend question, according to some implementations. FIG. 5A shows a conversational interface 500, according to some implementations. The example shows a user asking a question 502 ("What is the population of Peru?"). Based on user preferences, and the question, the system may respond with a simple text response 504 ("In 2017, the population of Peru was 32 million"). Suppose the system knows that the user prefers longer messages or more context than brief messages. The system may produce a longer response, such as the text 506 ("In 2017, the population of Peru was 32 million. Would you like to know the population of nearby countries?") shown in FIG. 5B. Note that, in this example, the system also generates and asks a follow-up question, to ask if the user wants to know additional details (e.g., the population of nearby countries). In some instances, for generating the text, the system generates a query corresponding to a natural language command or question asked by the user, queries an underlying database to retrieve values for one or more data fields (e.g., population of Peru in 2017), and uses the values retrieved to generate the text. Next, suppose the user preferences show that the user prefers a data visualization along with a textual response. The system generates and displays a data visualization response for the question, along with the text response. This example is shown in FIG. 5C. In addition to the text response 508, the conversational interface 400 also shows a line graph 510 showing values of the relevant data field plotted over time. Suppose further that the user preferences indicate that the user prefers more context or details regarding the comparison, with the data visualization. Based on the user preference, some systems generate and display more context (e.g., population of nearby countries, as shown in the graph 514, along with expanded text 512 to "Check out this chart which also shows 2 nearby countries.") Note that, in this example, the system automatically retrieved and displayed data (based on user preferences for more context) for nearby countries, without the user requesting the same. Between FIGS. 5B and 5C, another aspect of some systems is also apparent. Some implementations make dynamic decisions (e.g., determine if the user currently prefers charts, or additional context, as opposed to making a determination based on historical user preferences). Some implementations determine the layout of the user interface and/or data visualization interface based on the display screen of the user's device. For example, a mobile device likely has a smaller screen size, so the system may choose a portrait mode or a landscape mode, or divide the layout accordingly. Some implementations determine which data visualization may be appropriate for the given screen dimensions based on underlying data, and/or user preferences.

Some implementations provide text plus bar chart responses to comparison questions. For example, some implementations respond with text plus charts for the questions "Are there more events in Weightlifting or Taekwondo?" and "Did Rowing or Diving have larger viewership?".

Some implementations provide text, text plus charts, or only charts (or an appropriate data visualization) based on level or extent of difference between values of data fields in a user question. Some implementations generate bars versus lines versus annotations based on level or extent of difference between values of data fields in a user question.

Some implementations generate and display charts in conversational interfaces across question types. Some implementations show additional context (by default) along with generated data visualizations. For the example discussed above, some implementations show additional sports beyond the two named in the user question.

Some implementations track user preferences (e.g., over sessions or during a session) to determine the reason for a switch (of a user preference) from text to charts (or vice versa), and use the information collected to automatically adjust further responses (e.g., determine when to automatically generate a visualization). For example, a user may switch from text to charts because just viewing a top answer was not enough. For a future session, for the same user, the system can automatically switch the top answers and/or show different visualizations.

Some implementations account for errors in data visualizations when evaluating user responses to the visualizations. Some implementations iterate generating and displaying data visualizations, and evaluating responses until the distribution of answers across participants and question types suggest patterns for visualization responses. Some implementations perform analysis across conversational styles beyond chat and/or having more screen space (e.g., larger than a phone-sized device), or use multiple sessions between bot and human. Some implementations determine extent of additional context (e.g., maximum number of bars) required for a chat-bot (versus a more standard graphical user interface).

In this way, some implementations determine appropriateness for including visualizations in conversational interface based on user preferences. Some implementations provide additional context along with charts, beyond the exact answers to user questions. Some implementations use charts containing contextual information as a default, and provide personalization options. Some implementations learn, from user feedback, both the presentation format and information quantity.

FIGS. 6A-6I provide a flowchart of a method 600 that incorporates (602) data visualizations into conversational interfaces, according to some implementations. The method is performed (604) at a computer (e.g., the computing device 200) having a display (e.g., the display 212), one or more processors (e.g., the processors 202), and memory (e.g., the memory 206). The memory stores (606) one or more programs configured for execution by the one or more processors. The method includes receiving (608) a user input specifying a natural language command via a conversational interface (e.g., the conversational module 242 processes user input entered via the graphical user interface 232, and/or via the audio input module 228). The method also includes analyzing (610) the natural language command (e.g., using the language processing module 238) to determine the type of question. In some implementations, the type of question is (612) one of: a comparative question, a superlative question, or a trend question. See the examples in FIGS. 3A-3D, 4A-4D, and 5A-5D.

The method also includes obtaining (614) a user preference for viewing responses based on text and/or visualizations. Referring to FIG. 6H, in some implementations, the method further includes analyzing (644) one or more responses from the user, in response to displayed visualizations and/or texts, to generate the user preference. Referring to FIG. 6I, in some implementations, the method further includes analyzing (646) responses from a plurality of users, in response to displayed visualizations and/or texts, to generate the user preference.

Referring back to FIG. 6A, the method also includes determining (616) if the user preference includes visualizations. The method also includes determining (618) if the type of question is answerable using data visualizations. Examples of tracking and analyzing user preferences are described above in reference to the conversation module 242 in FIG. 2, according to some implementations.

Figure 6A:
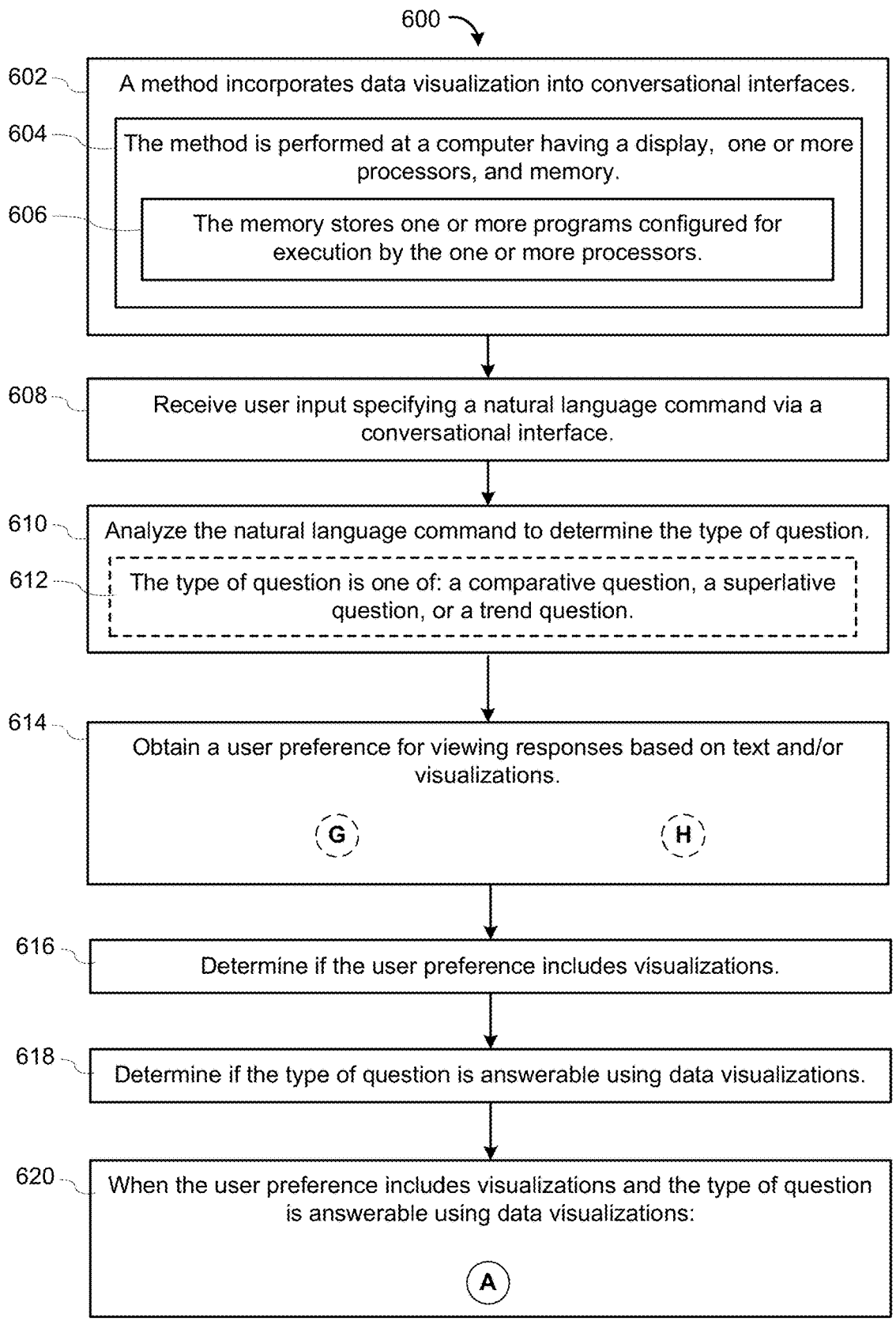
Figure 6B:
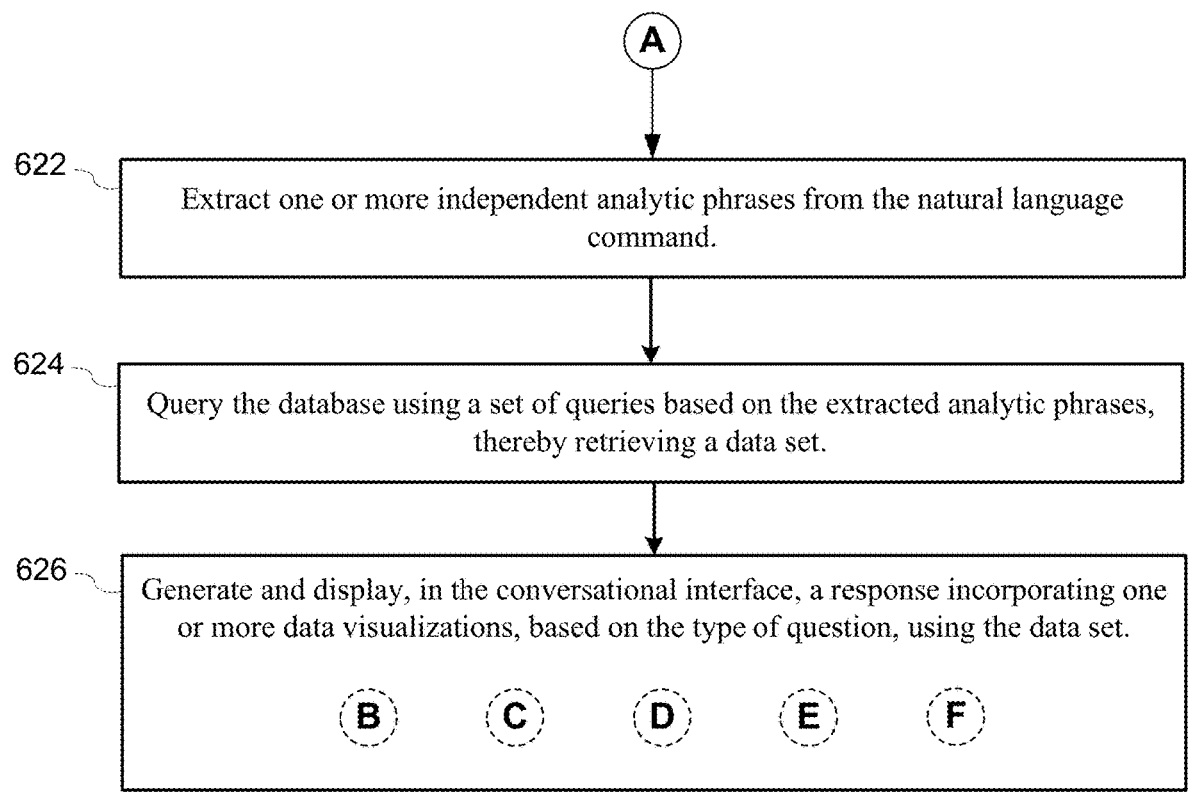

The method also includes, when the user preference includes visualizations and that the type of question is answerable using data visualizations, performing (620) steps in FIG. 6B. The steps include: extracting (622) one or more independent analytic phrases from the natural language command; querying (624) the database using a set of queries based on the extracted analytic phrases, thereby retrieving a data set; and generating and displaying (626), in the conversational interface, a response incorporating one or more data visualizations, based on the type of question, using the data set. Some implementations use the language processing module 238 described above in reference to FIG. 2, to perform one or more steps in FIG. 6B.

Referring next to FIG. 6C, in some implementations, the method further includes, when the user preference includes text and visualizations, generating and displaying (628) a text response summarizing the one or more data visualizations along with the one or more data visualizations.

Referring next to FIG. 6D, in some implementations, the type of question is comparative, and the method further includes generating (630) a bar chart comparing one or more data fields of the data set. In some implementations, the method further includes identifying (632) the one or more data fields from the data set based on the analysis of the natural language command.

Referring next to FIG. 6E, in some implementations, the type of question is trend analysis, and the method further includes generating (634) a trend chart for showing trends for a first data field of the data set. In some implementations, the method further includes: determining, based on the user preference, if additional context information is required. When the additional context information is required, the method adds (636) trends for one or more data fields of the data set related to the first data field.

Figure 6F:
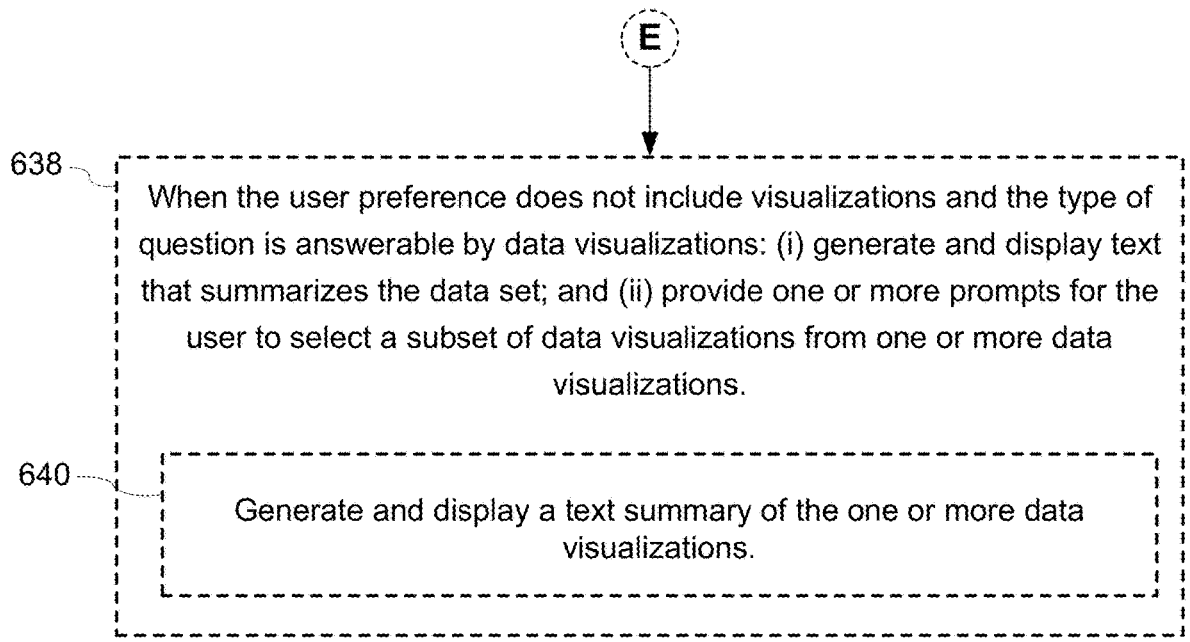

Referring next to FIG. 6F, in some implementations, the method further includes, when the user preference does not include visualizations and the type of question is answerable by data visualizations, performing (638) these steps: (i) generating and displaying text that summarizes the data set; and (ii) providing one or more prompts for the user to select a subset of data visualizations from one or more data visualizations. In some implementations, the method further includes generating and displaying (640) a text summary of the one or more data visualizations.

Figure 6G:
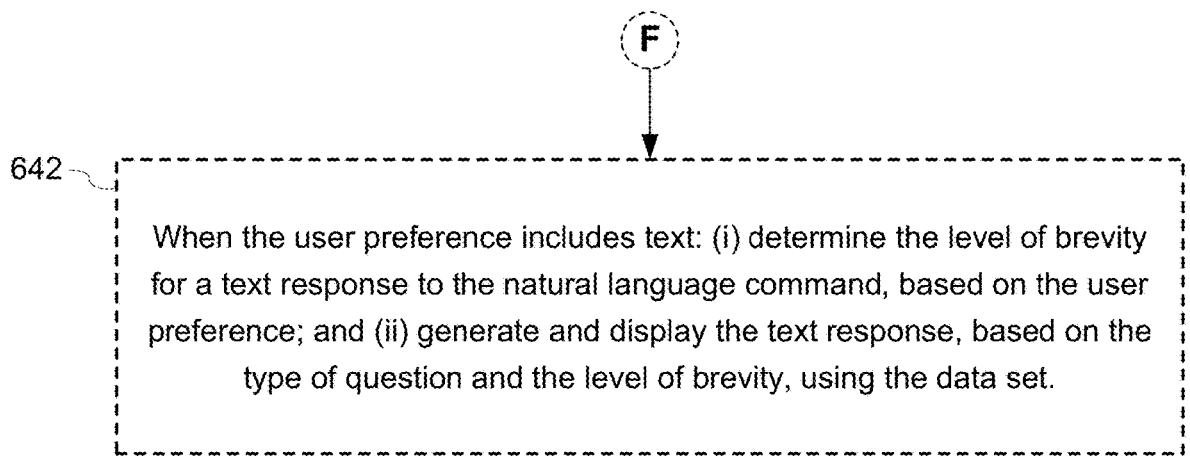
Figure 6H:
Figure 6I:

Referring next to FIG. 6G, in some implementations, the method further includes, when the user preference includes text, performing (642) these steps: (i) determining the level of brevity for a text response to the natural language command, based on the user preference; and (ii) generating and displaying the text response, based on the type of question and the level of brevity, using the data set.

Some implementations use the conversation module 242 and/or the data visualization application 230, described above in reference to FIG. 2, to perform one or more steps shown in FIGS. 6C-6G.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of incorporating data visualization into conversational interfaces, comprising:
   receiving user input specifying a natural language command via a conversational interface;
   analyzing the natural language command to determine a question type that is a comparative question, a superlative question, or a trend analysis question;
   for the user input and the determined question type, determining a corresponding preferred answer format that specifies inclusion of (1) textual responses and/or (2) responses comprising data visualizations; and
   in accordance with a determination that the preferred answer format includes responses comprising data visualizations:
      extracting one or more independent analytic phrases from the natural language command;
      querying a database using a set of queries based on the extracted analytic phrases, thereby retrieving a data set;
      selecting one or more data visualization types according to (1) the question type and (2) characteristics of the conversational interface, including layout, spatial dimensions, and/or orientation; and
      generating and displaying, in the conversational interface, one or more data visualizations having the selected one or more data visualization types, according to data in the retrieved data set.

2. The method of claim 1, further comprising:
   in accordance with a determination that the preferred answer format specifies inclusion of textual responses:
      (i) generating, based on the one or more data visualizations, a text response summarizing the one or more data visualizations, and (ii) displaying the text response along with the one or more data visualizations.

3. The method of claim 1, wherein the question type is comparative, and the method further comprises generating a bar chart comparing one or more data fields of the data set.

4. The method of claim 3, further comprising:
   identifying the one or more data fields from the data set based on the analysis of the natural language command.

5. The method of claim 1, wherein the question type is trend analysis, and the method further comprises generating a trend chart showing trends of a first data field of the data set.

6. The method of claim 5, further comprising:
   determining, based on the preferred answer format, if additional context information is required; and
   in accordance with a determination that the additional context information is required, adding trends for one or more data fields of the data set related to the first data field.

7. The method of claim 1, further comprising:
   in accordance with a determination that the preferred answer format specifies inclusion of textual responses:
      (i) determining a level of brevity for a text response to the natural language command, based on the preferred answer format, wherein the level of brevity corresponds to a length of the text response and/or amount of context to include in the text response; and
      (ii) generating and displaying the text response, based on the question type and the level of brevity, using the data set.

8. A The method of claim 1, further comprising:
   analyzing one or more responses from the user, in response to displayed visualizations and/or texts, to generate the preferred answer format.

9. The method of claim 1, further comprising:
   analyzing one or more responses from a plurality of users, in response to displayed visualizations and/or texts, to generate the preferred answer format.

10. A computer system for processing natural language database queries, comprising:
    one or more processors; and
    memory;
    wherein the memory stores one or more programs configured for execution by the one or more processors, and the one or more programs comprise instructions for:
    receiving user input specifying a natural language command via a conversational interface;
    analyzing the natural language command to determine a question type that is a comparative question, a superlative question, or a trend analysis question;
    for the user input and the determined question type, determining a corresponding preferred answer format that specifies inclusion of (1) textual responses and/or (2) responses comprising data visualizations; and
    in accordance with a determination that the preferred answer format includes responses comprising data visualizations:
       extracting one or more independent analytic phrases from the natural language command;
       querying a database using a set of queries based on the extracted analytic phrases, thereby retrieving a data set;
       selecting one or more data visualization types according to (1) the question type and (2) characteristics of the conversational interface, including layout, spatial dimensions, and/or orientation; and generating and displaying, in the conversational interface, one or more data visualizations having the selected one or more data visualization types, according to data in the retrieved data set.

11. The computer system of claim 10, wherein the one or more programs further comprise instructions for:

in accordance with a determination that the preferred answer format specifies inclusion of textual responses: (i) generating, based on the one or more data visualizations, a text response summarizing the one or more data visualizations, and (ii) displaying the text response along with the one or more data visualizations.

12. The computer system of claim 10, wherein the question type is comparative and the one or more programs further comprise instructions for generating a bar chart comparing one or more data fields of the data set.

13. The computer system of claim 10, wherein the one or more programs further comprise instructions for:

analyzing one or more responses from the user, in response to displayed visualizations and/or texts, to generate the preferred answer format.

14. The computer system of claim 10, wherein the one or more programs further comprise instructions for:

analyzing one or more responses from a plurality of users, in response to displayed visualizations and/or texts, to generate the preferred answer format.

15. A The computer system of claim 10, wherein the question type is trend analysis and the one or more programs further comprise instructions for generating a trend chart showing trends of a first data field of the data set.

16. A non-transitory computer readable storage medium storing one or more programs configured for execution by a computer system having a display, one or more processors, and memory, the one or more programs comprising instructions for:

receiving user input specifying a natural language command via a conversational interface;

analyzing the natural language command to determine a question type that is a comparative question, a superlative question, or a trend analysis question;

for the user input and the determined question type, determining a corresponding preferred answer format that specifies inclusion of (1) textual responses and/or (2) responses comprising data visualizations; and in accordance with a determination that the preferred answer format includes responses comprising data visualizations:

extracting one or more independent analytic phrases from the natural language command;

querying a database using a set of queries based on the extracted analytic phrases, thereby retrieving a data set;

selecting one or more data visualization types according to (1) the question type and (2) characteristics of the conversational interface, including layout, spatial dimensions, and/or orientation; and generating and displaying, in the conversational interface, one or more data visualizations having the selected one or more data visualization types, according to data in the retrieved data set.

* * * * *